United States Patent [19]

Dorn et al.

[11] Patent Number: 4,627,687
[45] Date of Patent: Dec. 9, 1986

[54] DEVICE FOR HOLDING IN POSITION A TRANSDUCER AND AN OPTICAL WAVEGUIDE

[75] Inventors: Reimund Dorn, Schwieberdingen; Heinz Ebner, Ditzingen; Johann Gundert, Korntal; Ernst Halder, Renningen; Werner Haspel, Stuttgart; Ingo Isert, Bietigheim-Bissingen; Gunter Kuhnemann, Vaihingen/Enz; Felix Lutz, Stuttgart; Gerhard Seibold, Remseck; Gerhard Wessel, Stuttgart, all of Fed. Rep. of Germany

[73] Assignee: International Standard Electric Corporation, New York, N.Y.

[21] Appl. No.: 584,177

[22] Filed: Feb. 27, 1984

[30] Foreign Application Priority Data

Mar. 3, 1983 [DE] Fed. Rep. of Germany ....... 3307465

[51] Int. Cl.[4] ................................................ G02B 6/36
[52] U.S. Cl. .................................. 350/96.20; 357/17; 357/81
[58] Field of Search ............... 350/96.15, 96.17, 96.18, 350/96.20; 250/227, 552; 357/17, 19, 30, 74, 80, 81

[56] References Cited

U.S. PATENT DOCUMENTS 4,065,203 12/1977 Goell et al. ...................... 350/96.20
4,119,363 10/1978 Camlibel et al. ................. 350/96.20
4,167,744 9/1979 Nyul .................................... 357/17
4,237,474 12/1980 Ladany .............................. 357/81
4,296,998 10/1981 Dufft ................................. 350/96.20

FOREIGN PATENT DOCUMENTS 0006042 12/1979 European Pat. Off. ......... 350/96.20
2093631 9/1982 United Kingdom ............. 350/96.20

OTHER PUBLICATIONS

Balliet et al., "Dual Fiber-Optic Source Coupling", IBM Tech. Discl. Bull., vol. 24, No. 2, Jul. 1981, pp. 1156-1157.

Primary Examiner—John Lee
Attorney, Agent, or Firm—T. L. Peterson; J. S. Christopher

[57] ABSTRACT

A positioning device comprising a bolt having a transducer and an optical waveguide fixed inside a guide sleeve mounted concentric with the longitudinal axis of the bolt. Supporting members on the bolt for the transducer and the guide sleeve are arranged in a spaced relation. The supporting member for the guide sleeve comprises a semi-cylindrical shell provided with an extended supporting arm on which the sleeve is mounted. A plate-shaped supporting member for the transducer is mounted in the shell. To achieve an improved separation of the heat-flow paths, slots are cut on opposite sides of the supporting arm into the shell.

6 Claims, 3 Drawing Figures

U.S. Patent   Dec. 9, 1986   4,627,687
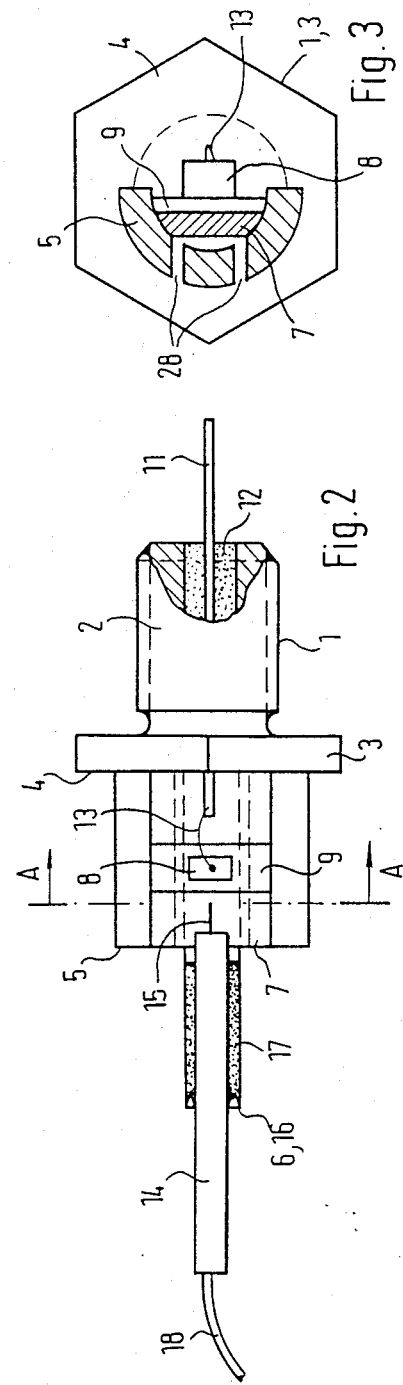
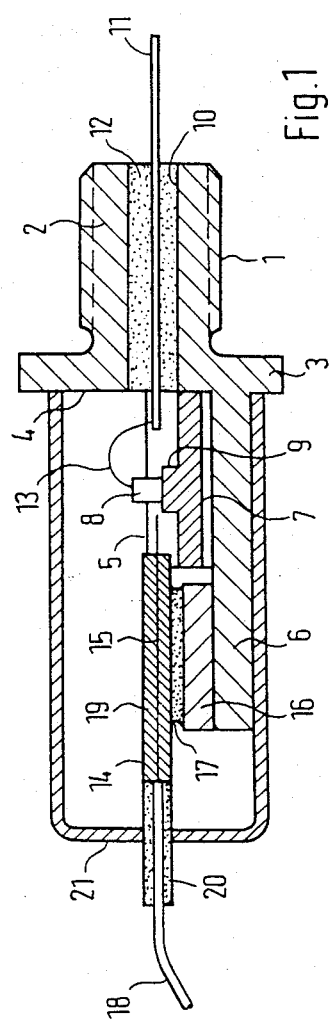

DEVICE FOR HOLDING IN POSITION A TRANSDUCER AND AN OPTICAL WAVEGUIDE

BACKGROUND OF THE INVENTION

The invention relates to a device for holding a transducer and an optical waveguide in position.

Published German patent application DE-OS 30 46 415 discloses such a positioning device comprising a bolt having on its end face an extension of reduced cross section which serves as a base for a laser disposed at the end of the extension. Next to this extension, in a spaced relation, a further column-shaped base is mounted. The latter base carries a bead of tin solder with an optical waveguide embedded therein. Both base arrangements are enclosed by a cylindrical casing which is covered by means of a cap. The casing has an opening on the side in which a flange sleeve is mounted. Through this flange sleeve the optical waveguide extends up to in front of the laser. The projecting end of the flange sleeve is hermetically sealed by means of molten solder.

The end section of the optical waveguide is secured in position while the casing is still open and the laser is turned on. The previously metallized end of the optical waveguide is inserted through the bore of a body of tin solder which is still cold and the body is disposed on the column-shaped base. A tool holding the optical waveguide, which is controlled by a micromanipulator, adjusts the optical waveguide until the light output measured at its free end, reaches an optimum value. Thereupon, the body consisting of a low-melting tin, is melted with the aid of a soldering device containing a separate laser. In the course of this process there is formed a bead of solder which, upon solidifying, fixes the optical waveguide on the column-shaped base in the adjusted position.

It is the object of the present invention to provide a device for holding in position a transducer and an optical waveguide ending in front of the transducer, which can be more economically manufactured.

SUMMARY OF THE INVENTION

According to the invention there is provided a device for holding in position an electrical-to-optical or optical-to-electrical transducer and an optical waveguide ending in front of the transducer. The device includes a bolt having on one end thereof a first supporting member for the transducer and a second supporting member for the waveguide. A protective cap on one end of said bolt encloses the support members, transducer and the waveguide. The second supporting member comprises a semi-cylindrical shell having an extended supporting arm. A guide sleeve containing the waveguide is mounted on the arm. The guide sleeve and transducer are concentric with the longitudinal axis of the bolt. The first supporting member is mounted in the shell. A conductor extends through a bore in the other end of the bolt and is insulated from the bolt. A wire electrically connects the conductor and the transducer.

By the foregoing arrangement the conductor in the bore, the transducer and the optical waveguide are in alignment with the center axis of the bolt. In this way there is achieved a stretched construction system of the device which, prior to the mounting of the protective cap, permits the individual parts thereof to be mounted and adjusted freely. The free accessibility permits an automatic manufacture of the device involving relatively simple movements. Moreover, the constructional design of the supporting member for the optical waveguide permits the use of a simple soldering method with a substantially locally restricted heating. Therefore, any obstructions of the functionability of the transducer are avoided. Finally, the device only has a small number of openings to be closed or edges, so that the device can be hermetically sealed without causing any difficulties. Therefore, detrimental environmental influences are extensively excluded.

BRIEF DESCRIPTION OF THE DRAWING

FIG. 1 shows an encapsulated device including a transducer and an optical waveguide ending in front of the transducer, in partial longitudinal section;

FIG. 2 shows the device of FIG. 1 with the protective cap removed as viewed from above; and FIG. 3 is a transverse sectional view of the device taken along line A—A of FIG. 2.

DESCRIPTION OF THE PREFERRED EMBODIMENTS

In FIGS. 1 to 3 the base body of the device, designed as a bolt, is indicated by the reference numeral 1. Its shank 2 is provided with an external thread. The head of the bolt consists of a flange 3 which preferably has a hexagonal cross section. On the front end face 4 of the bolt 1 there is disposed the supporting member for the optical waveguide. In the embodiment of the device as shown in FIGS. 1 to 3, the waveguide supporting member comprises a semi-cylindrical shell 5 disposed within the marginal area of the flange 3. The shell has an extended narrow supporting arm 6. The supporting member 7 for the transducer is mounted in the shell 5. The supporting member 7 comprises a one-piece, substantially plate-shaped body whose longitudinal sides are curved to conform to the radius of the shell 5. A cross piece 9 supporting the transducer 8 is mounted on the top side of the supporting member 7.

The bolt 1 is traversed by a centrally disposed bore 10. A connecting wire 11 is supported in the bore by insulation 12. A short length of the wire 11 projects out from the end face 4 of the bolt 1. A considerably longer length of the wire projects out from the shank end of the bolt 1. The material for the insulation 12 is preferably glass, in which the connecting wire 11 is sealed in a gas-tight manner. The end of the connecting wire 11 projecting from the front end face 4 of the bolt 1 is electrically connected to the transducer 8 by a thin bridging wire 13. The second electric path for the transducer 8 is formed by the supporting member 7 consisting of copper or a copper alloy, which is connected to the bolt 1, which is preferably formed of steel. The height of the supporting member 7 is appropriately so dimensioned that the light-wave-emitting or-receiving surface of the transducer 8 intersects the longitudinal axis of the bolt.

In order to bring the optical waveguide 15, fixed in a guide sleeve 14, to the level of the longitudinal axis of the bolt 1, the supporting arm 6 of the bolt is provided with a spacing piece 16 welded or soldered thereto. However, the spacing piece may also form a one-piece integral part of the supporting arm 6. To this spacing piece 16 the guide sleeve 14 is secured with the aid of soldering material 17. The guide sleeve 14 extends at least over the total length of the spacer 16. The end of the optical waveguide 15, which has been stripped of its outer cable sheathing 18, is secured within the guide sleeve by soldering metal 19. A short length of the optical waveguide 15 projects from the guide sleeve almost concentrically. The cylindrical guide sleeve 14, which is preferably made from brass, has an inside diameter which is larger than that of the sheathed optical waveguide 15. The outer cable sheathing 18, throughout the remaining length of the guide sleeve 14, is secured with the aid of an adhesive 20. The cable sheathing 18 connected to the guide sleeve 14 acts as a mechanical strain relief for the optical waveguide 15.

In cases where the transducer 8 is designed as a laser diode, heat is produced during operation of the device, which is dissipated via the supporting member 7 into the bolt 1. For this reason, the surfaces of contact between the supporting member 7 and the bolt are tightly connected to one another in a thermally well-conducting manner. The supporting member 7 is secured in the shell 5, for example, by way of pressing-in, soldering or welding. Heat is also produced while securing the guide sleeve 14 containing the optical waveguide 15, by way of soldering in the course of manufacturing the device. Because the soldering is coupled to the adjustment of the optical waveguide 15 to the light source, these processes are carried out during operation of the laser diode. In order to prevent heat from accumulating in the member 7 supporting the transducer, special steps have to be taken. These reside in particular in keeping the temperature required for the soldering, as low as possible and, in addition thereto, in separating the heat flow of both heat sources as far as possible from one another.

In the embodiment shown in the drawing, the supporting member 7 for the transducer 8 has large heat dissipating surfaces which are connected to the end face 4 of the bolt as well as to the shell 5 of the supporting member for the optical waveguide 15. Separation of the heat flow is effected by the plate-shaped form of the supporting member for the transducer, between whose plane bottom side and the concave top side of the shell there is formed a heat-insulating air gap. In addition slots 28 are cut into the shell 5 on the longitudinal sides of the supporting arm 6 for the optical waveguide 15 (FIG. 3). These two slots 28 preferably extend up to the end face 4 of the bolt 1. In a simplified embodiment of the invention, not shown, the supporting member 7 consists of a substantially semi-cylindrical body having a jacketing surface shaped to conform to the radius of the shell 5, and the crosspiece 9 is disposed on the top side thereof. Because in this case the entire jacketing surface is to have a heat-dissipating effect, the slots 28 which are otherwise cut into the shell 5, may be omitted.

In the case of the supporting member for the optical waveguide 15, what matters is not so much the thermal conductivity, but primarily the mechanical strength thereof. Thus, the shell 5 together with the supporting arm 6 may form a one-piece constitutent part of the bolt 1.

The device can be enclosed without causing any difficulties. For this purpose there is used a sleeve-shaped protective cap 21 preferably made of steel. In the closed end of the cap there is provided a bore corresponding to the outer diameter of the guide sleeve 14. The protective cap 21 is slipped over the guide sleeve 14 until its open end abuts against the flange 3 of the bolt 1. The cap is welded or soldered to the flange. In this position, the guide sleeve 14 projects out of the protective cap 21, so that at the lead-through point it is possible to establish a welded or soldered joint. Since also the metal embedding of the optical waveguide 15 hermetically seals the interior of the guide sleeve 14, all parts of the device disposed within the protective cap 21 are sealed in a gas-tight manner and are free from adhesive.

What is claimed is:

1. A device holding in position an electrical-to-optical or optical-to-electrical transducer and an optical waveguide ending in front of said transducer and having improved separation of heat flow between the transducer and the waveguide comprising:
   a bolt having on one end thereof a first supporting member for said transducer and a second supporting member for said waveguide, said bolt having a longitudinal axis;
   a protective cap on said one end of said bolt enclosing said supporting members, transducer and the waveguide;
   said second supporting member comprising a semi-cylindrical shell having an extended supporting arm and said shell having slots which extend along the longitudinal sides of said supporting arm;
   a guide sleeve containing said waveguide mounted on said arm concentric with said axis;
   said transducer intersecting said axis;
   said first supporting member having a substantially flat body and having longitudinal sides mounted in said shell and having a flat bottom spaced from said shell providing an air gap therebetween whereby the slots and the air gap separate the heat flow between said first supporting member and said second supporting member;
   a bore extending through said bolt;
   a conductor extending through said bore and insulated from said bolt, and
   means making electrical connection between said conductor and said transducer.

2. A device as set forth in claim 1 wherein:
said shell and said supporting arm form a one-piece integral part of said bolt.

3. A device as set forth in claim 1 wherein:
a spacing piece is welded or soldered to said supporting arm, and said guide sleeve is mounted on said spacing piece.

4. A device as set forth in claim 1 wherein:
said first supporting member comprises a substantially plate-shaped body having curved longitudinal sides conforming to the radius of said shell, and a crosspiece supporting said transducer is mounted on the top side of said body.

5. A device as set forth in claim 1, wherein:
said guide sleeve is formed of brass.

6. A device as set forth in claim 1 wherein:
said guide sleeve projects out of said protective cap and is sealed to said protective cap in a gas-tight manner.

* * * * *